United States Patent Office 3,756,984
Patented Sept. 4, 1973

3,756,984
EPOXY-IMIDAZOLE ADDUCTS AS CURING AGENTS FOR EPOXY RESINS
Cornelis H. J. Klaren and Hans Krak, Delft, Netherlands, and Francis Jeanno, Paris, France, assignors to Shell Oil Company, New York, N.Y.
No Drawing. Continuation of abandoned application Ser. No. 785,781, Dec. 20, 1968. This application Sept. 27, 1971, Ser. No. 184,200
Claims priority, application France, Mar. 4, 1968, 142,222
Int. Cl. C08g 30/14
U.S. Cl. 260—47 EC    11 Claims

ABSTRACT OF THE DISCLOSURE

The adducts of mono- and polyepoxides with imidazoles having a secondary amino group in the ring are excellent latent curing agents for epoxy resins and accelerators for anhydride curing of polyepoxides.

BACKGROUND OF THE INVENTION

This is a continuation of application Ser. No. 785,781, filed Dec. 20, 1968, and now abandoned.

Many conventional polyepoxide-curing agent systems have certain drawbacks that limit their industrial use. For example, known mixtures comprising polyepoxides and aliphatic amines set up rather rapidly, and this necessitates mixing of the components just before use, and rapid use of the mixture before cure sets in. It is known that the working time or pot life can be extended by the use of aromatic amines, but this in turn requires the use of much higher temperatures during a rather long time to effect the ultimate cure, and further, such mixtures of polyepoxides and aromatic amines, even if they are allowes to react partially to the so-called "B-stage," still have a shelf life of a few weeks at most at ambient temperature.

Imidazole compounds having a secondary amino group in the ring, and salts of such imidazole compounds have been proposed to overcome some of the objections of the earlier curing agents. However, the restricted self life of such imidazole compounds, when mixed with polyepoxides, their volatility, and their small but distinct hydroscopy make it desirable to look for alternatives which would not have these drawbacks.

It has now been found that these drawbacks may be avoided by using as curing agents adducts of epoxides with imidazole compounds having a secondary amino group in the ring.

The invention relates to a process for curing polyepoxides using derivatives of a special type of cyclic nitrogen compounds, and to the cured products obtained thereby. Specifically, the invention relates to the use of novel nitrogen-containing curing agents which are easy to mix with polyexpoxides, which can be used in combination with other curing agents and which provide polyepoxide-curing agent mixtures with greatly extended shelf life.

SUMMARY OF THE INVENTION

The present invention relates to the preparation of epoxyimidazole adducts which are excellent curing agents and accelerators for the anhydride curing of polyepoxides to produce insoluble, infusible compositions.

The present invention also relates to a process for converting a polyepoxide having more than one epoxy group per molecule to an insoluble infusible product which comprises curing the polyepoxide at elevated temperature with an adduct of an epoxy compound (monoepoxides or polyepoxides) and an imidazole compound having a secondary amino group in the imidazole ring.

Pulverulent mixtures of these solid epoxy-imidazole adducts and solid epoxy resins, optionally, in combination with other curing agents such as amines, anhydrides, etc., have excellent storage stability and rapid cure. These pulverulent mixtures are excellently suitable for use as molding powders and as coating powders such as in fluidized bed and electrostatic techniques.

DESCRIPTION OF THE PREFERRED EMBODIMENT

The present invention is particularly directed to the preparation of adducts of monoepoxides or polyepoxides with imidazoles having a secondary amino group in the ring wherein the epoxy compound is reacted with the imidazole compound in the ratio of 0.8 to 1.2 epoxy group per secondary amino group, and preferably in a 1:1 ratio.

The epoxy compounds used for the preparation of the adducts may be monoepoxides or polyepoxides. Suitable monoepoxides are monoglycidyl ethers, for example butyl glycidyl ether, hexyl glycidyl ether, phenyl glycidyl ether, p-xylyl glycidyl ether, and p-hexyl phenyl glycidyl ether. Other suitable monoepoxides are monoglycidyl esters of monocarboxylic acids, for example glycidyl acetate, glycidyl butyrate, glycidyl hexoate, glycidyl laurate, and glycidyl benzoate.

Very suitable monoepoxides are the monoglycidyl esters of saturated aliphatic monocarboxylic acids in which the carboxyl groups are attached to tertiary or quaternary carbon atoms.

Suitable such alpha-branched, saturated, monocarboxylic acids may be represented by the general formula:

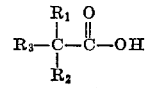

wherein $R_1$ and $R_2$ each represent the same or different alkyl radicals of normal, branched or cyclic structure and $R_3$ represents hydrogen or a hydrocarbonyl radical, preferably an alkyl radical. In the foregoing formula, $R_1$ and $R_2$ each may be a methyl, ethyl, propyl, butyl, pentyl, octyl, decyl, etc. radical. Hydrocarbyl radicals represented by $R_3$ comprise, for example, alkyl radicals of normal, branched or cyclic structure, including methyl, ethyl, propyl, butyl, etc., as well as alkaryl, aralkyl and aryl radicals; however, alkyl radicals are preferred. Very suitable such monocarboxylic acids include the alpha, alpha-dialkyl monocarboxylic acids containing a total of from 4 to 20 carbon atoms. A preferred group of monocarboxylic acids are those containing a mixture of monocarboxylic acids containing from 9 to 11 carbon atoms and derived from a $C_8$-$C_{10}$ olefin mixture by the well-known Koch Synthesis and subsequent modifications thereof. Suitable methods for the preparation of these acids are disclosed in U.S. 3,059,005, U.S. 3,059,006, U.S. 3,059,007, U.S. 3,047,662, U.S. 3,186,974 and in "Carbonsaire-Synthese our Ilefinen, Kohlenoxyd and Wasser," Koch, Brennstoff-Chemie, November 1955, pages 321–328.

As saturated, aliphatic, monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated, aliphatic, monocarboxylic acids branched at the alpha position and prepared in this manner are sometimes called Koch acids in the art. Monocarboxylic acids branched at the alpha position can also be obtained according to Reppe's method. Of special value are the acids from monoolefins with 8 to 18 carbon atoms. Mixtures of olefins obtained by cracking paraffinic hydrocarbons, such as petroleum fractions, are preferably used as starting materials. These mixtures may contain both branched and unbranched acyclic olefins as well as cycloaliphatic olefins. By the action of formic acid or carbon monoxide and water, a mixture of saturated acyclic and cycloaliphatic monocarboxylic acids is obtained therefrom.

Although the starting materials for preparing the monocarboxylic acids are olefinic fractions containing, in general, a carbon atom range of 2–3 carbon atoms such as $C_8$–$C_{10}$, other olefinic starting materials such as isobutylene, propylene trimer and diisobutylene, may be utilized. The branched carboxylic acids or mixtures thereof prepared from these hydrocarbons are exclusive acyclic.

These monocarboxylic acids may be converted to the respective glycidyl esters by reaction with epichlorohydrin using techniques well-known in the art.

The epoxy alkyl esters of the alpha-branched saturated aliphatic monocarboxylic acids may be prepared by any of the known methods, such as, for example, by simply reacting under known conditions, a halo-substituted monoepoxide or a dihalohydrin with an alpha-branched saturated aliphatic monocarboxylic acid, or their salts. Suitable halo-substituted epoxide reactants include the bromo- and fluoro-substituted compounds although the chloroepoxy compounds are preferred. The halo substituted epoxide reactant may suitably contain from about 3 to about 20 carbon atoms in the molecule. Preferred reactants include, among others, epibromohydrin, epifluorohydron, 1-chloro-2,3-epoxybutane, 1-chloro-2,3-epoxyhexane, 1-chloro-2,3-epoxy-4-phenyl octane, 1-chloro-2,3-epoxy-4,5-diethyl dodecane, 3-chloro-4,5-epoxy octane.

Suitable dihalohydrins comprise the hydroxy-dihalosubstituted alkanes containing from about 3 to about 20 carbon atoms and are preferably hydroxy-dichloro-substituted alkanes having a chlorine atom and a hydroxyl group attached to adjacent carbon atoms. Suitably hydroxy-dichloro-substituted alkanes include, among others, 1,3-dichlorohydrin, 1,2-dichlorohydrin, their homologues and analogues.

Polyepoxy compounds which may be used for the preparation of the adducts are compounds having on an average more than one vicinal epoxy group per molecule. Preferred polyepoxy compounds are polyglycidyl ethers of polyhydric phenols and of polyhydric alcohols and polyglycidyl esters of polycarboxylic acids. The ratio in which the components are reacted to prepare the adduct may be from 0.8 to 1.2 epoxy group in the polyepoxide per secondary amino group in the imidazole compound. Examples of polyepoxy compounds for making the adducts are: polyglycidyl ethers of 2,2-bis(4-hydroxyphenyl) propane, polyglycidyl ethers of resorcinol, and polyglycidyl ethers of novolacs and resols. Preferred are polyglycidyl ethers of 2,2-bis(4-hydroxyphenyl)propane having a molecular weight between 340 and 1000, in particular those which have an epoxy equivalent weight below 300. The epoxy equivalent weight which is the value needed for selecting the proper weight ratio of the two components for the preparation of the adduct can be determined by reaction of a sample of the epoxy compound with an excess of hydrochloric acid in dimethyl formamide and back-titrating the excess of HCl with sodium hydroxide in methanol. Mixtures of monoepoxy compounds and polyepoxy compounds may also be used for the preparation of the adducts.

Other suitable polyepoxy compounds are described hereinafter when the preparation of the insoluble, infusible products are discussed.

Imidazole compounds preferred for the preparation of the present adducts have the formula

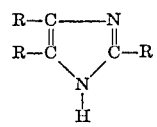

wherein each R separately denote hydrogen, halogen or a hydrocarbon radical, preferably an alkyl or cycloaliphatic radical of up to about 12 carbon atoms and aryl radicals such as phenyl, talyl, xylyl, etc. Examples of suitable starting materials are imidazole, 2-methylimidazole, 4-methylimidazole 5-methylimidazole, 2,4-dimethylimidazole, 2-ethyl-4-methylimidazole, 4-butyl-5-ethyl-imidazole, 2-cyclohexyl-4-methylimidazole, 2-ethyl-4-phenylimidazole, and mixtures thereof.

Other imidazoles suitable for making the adducts are benzimidazoles of the formula

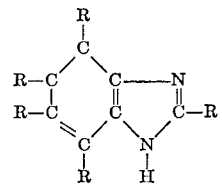

wherein each R denotes a halogen atom, a hydrocarbon radical, such as, preferably an alkyl or cycloaliphatic radical of up to about 12 carbon atoms and aryl radicals such as phenyl, tolyl, xlyl, etc., or more preferably a hydrogen atom.

The adducts can be prepared by mixing the epoxy compound and imidazoles in the proportions indicated above. To accelerate the formation of the adduct, the mixture is preferably kept for some hours at moderately elevated temperature, for example at 50 to 150° C., during a time which may vary, depending on the temperature, from 24 hours to ½ hour. The adducts so obtained are used as curing agents for polyepoxides according to the invention and are fusible compounds, which are soluble in organic solvents such as ketones and esters.

The polyepoxides which are used in the present invention for conversion into insoluble infusible products by the action of the adducts described above are those compounds having on an average more than one epoxy group, i.e., a

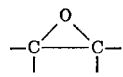

group, per molecule. The number of epoxy groups in the average molecule is obtained by dividing the average moleclar weight of the polyepoxide by the epoxide equivalent weight. The polyepoxides may be saturated or unsaturated, aliphatic, cycloaliphatic, aromatic, or heterocyclic and may be substituted, if desired, with non-interfering substituents, such as halogen atoms, hydroxyl groups and ether groups. They may also be monomeric or polymeric.

Preferred polyepoxides are glycidyl ethers of polyhydric phenols such as diphenylol alkanes, e.g. 2,2-bis(4-hydroxyphenyl)-propane, 1,1-bis(4-hydroxyphenyl)ethane, and bis(4-hydroxyphenyl)-methane, 4,4'-dihydroxydiphenyl sulphone, hydroquinone, resorcinol, dihydroxydiphenyl, dihydroxy naphthalenes, and polyhydric phenols such as novolacs and resols prepared by condensation of phenol or cresols with formaldehyde.

Glycidyl ethers of polyhydric phenols can be prepared, for example, by reaction of the polyhydric phenol with epichlorohydrin in the presence of a base, such as sodium hydroxide or potassium hydroxide. Important polyepoxides are the glycidyl ethers of 2,2-bis(4-hydroxyphenyl)propane. The molecular weight and also the softening point, the epoxide equivalent weight and the viscosity generally depend on the ratio of epichlorohydrin to 2,2-bis(4-hydroxyphenyl)propane. If a large excess of epichlorohydrin is used, e.g. 10 molecules of epichlorohydrin per molecule of 2,2-bis(4-hydroxyphenyl)propane, the reaction product is a glycidyl ether of low molecular weight, which is usually a viscous liquid. If the ratio of epichlorohydrin to 2,2-bis(4-hydroxyphenyl)propane is between 2:1 to 1:1 the reaction product is a glycidyl polyether of elevated molecular weight of the general formula

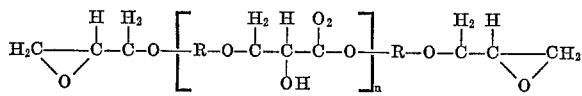

wherein R is the divalent hydrocarbon residue

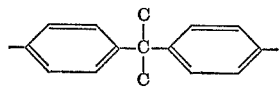

and $n$ is a number between 1 and 20; these polyepoxides are usually solid at ambient temperature, with softening points between 50 and 170° C., and soluble in organic solvents such as ketones and esters. The polyethers may in some cases contain small amounts of material with a terminal glycidyl group in hydrated form.

Other suitable polyepoxides are poly(epoxyalkyl) ethers of aliphatic polyhydroxy compounds such as ethylene glycol, glycerol, trimethylol propane, and pentaerythritol; polyglycidyl esters of polycarboxylic acids such as the diglycidyl esters of phthalic acid, adipic acid, tetrahydrophthalic acid, hexahydrophthalic acid; polyglycidyl esters of polymer unsaturated fatty acids, for example, diglycidyl ester of dimerized linoleic acid; epoxidized esters of unsaturated acids, such as epoxidized linseed oil or soyabean oil, epoxidized dienes such as diepoxybutane, epoxidized vinylcyclohexane, and 3,4-epoxy-6-epoxy-6-methylcyclohexylmethyl ester of 3,4-epoxy-6-methylcyclohexane carboxylic acid and similar compounds. Mixtures of polyepoxides described above and mixtures with monoepoxides may also be used, for example to reduce the viscosity of a polyepoxide.

The quantities in which the polyepoxide and the adduct are combined may be varied over a wide range. The imidazole adducts are preferably employed in amounts from 0.1 to 20% by weight of the polyepoxide, while amounts ranging from 0.5 to 15% by weight of the polyepoxide are particularly preferred.

The imidazole adducts can be used in combination with co-curing agents such as phenols, mercaptans, polycarboxylic acids and their anhydrides, phosphines, amino compounds, amine salts, and quaternary ammonium salts. Examples of suitable amines that can be used in combination with the imidazole adducts are aliphatic monoamines such as dimethylethanol amine, methyldiethanol amine, morpholine, stearyldimethyl amine, tri-n-hexylamine; aliphatic polyfunctional amino compounds such as ethylene diamine, diethylenetriamine, N,N-dimethyl aminopropylamine, dicyandiamide, guanidine, and amidines; cycloaliphatic amines such as di(4-aminocyclohexyl)methane, di(3-methyl-4-aminocyclohexyl)methane, and 1-amino-3-aminomethyl-3,5,5-trimethyl cyclohexane (isophorone diamine); aromatic amines such as p,p'-bis-(aminophenyl)methane, p,p'-bis(aminophenyl)sulphone, m-phenylenediamine, and heterocyclic amino compounds such as melamine. Polycarboxylic acid anhydrides that can be used as co-curing agent are: Phthalic anhydride, tetrahydrophthalic anhydride, hexahydrophthalic anhydride, bicyclo-2.2.1-heptene-2,3-dicarboxylic anhydride, methyl bicyclo-2,2,1-heptene - 2,3 - dicarboxylic anhydride isomers, 1,4,5,6,7,7-hexachloro-bicyclo 2.2.1-5-heptene-2-3-dicarboxylic anhydride, succinic anhydride, alkenyl succinic anhydrides, pyromellitic dianhydride, 3,3',4,4'-benzophenone tetracarboxylic dianhydride, trimellitic anhydride and partial esters thereof with ethylene glycol and glycerol. Mixtures of two or more polycarboxylic anhydrides may also be used.

The above-noted co-curing agents are generally employed in amounts varying according to the nature and the equivalent weights of co-curing agent and polyepoxide. Polycarboxylic acid anhydrides are preferably used in a ratio higher than 0.8, usually between 1.0 and 2.3, acid equivalents per epoxide equivalent. Amino compounds having more than one hydrogen atom attached to nitrogen are preferably used in a ratio from 0.8 to 1.2 active hydrogen equivalents per epoxide equivalent.

Mercaptans useful as co-curing agents are preferably liquid polymercapto-polysulphides such as compounds having the general structure

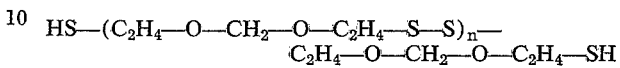

having molecular weights of 500 to 1000; such mercaptans are preferably used in amounts of 25 to 100 parts by weight per 100 parts by weight of polyepoxide.

The adducts used according to the present invention in combination with co-curing agents facilitate handling of the mixtures and the cure they allow storage for a prolonged period without loss of handling facilities and without loss of desired properties after cure. In many cases the curing times and curing temperatures can be considerably lower than without the use of the present adducts as catalysts. The curing of the polyepoxides may be accomplished by mixing the polyepoxide with the imidazole adduct, if desired with co-curing agent added, and heating the mixture.

Various additives may be included in the mixture before cure, such as solvents, diluents, pigments, fillers, fibrous materials, dyes, resins, polyolefins, plasticizers, and non-volatile extenders, such as coal tar, coal tar pitch, and asphaltic bitumen, for example a blown bitumen or a cut-back bitumen prepared from an asphaltic bitumen and aromatic lube oil extract, pine oil, pine tar, lube oils and aromatic extracts thereof.

In general, the polyepoxide and the imidazole adduct can be mixed by gentle heating, or by dissolving the components in a solvent. Suitable solvents are ketones, such as acetone, methyl ethyl ketone, methyl isobutyl ketone, methyl cyclohexanone, and diacetone alcohol; esters such as ethyl acetate, and n-butyl acetate; glycol ethers such as ethylene glycol monomethyl ether, ethylene glycol monoethyl ether, and the acetates thereof. Suitable diluents are benzene, toluene, xylene, and liquid monoepoxides. Monoepoxy diluents such as butyl glycidyl ether, phenylglycidyl ether, and monoglycidyl esters take part in the curing reaction, and may be used generally in amounts of up to 20% by weight of the polyepoxide.

The temperatures employed during the cure may vary over a wide range. Preferred temperatures range from 50 to 250° C.

The process of the invention can be used for the manufacture of cured articles by forming, coating, or impregnating an article with a composition comprising a polyepoxide and an adduct as described hereinbefore, and curing at elevated temperature. The cured products adhere very well to a large variety of substrates, such as steel, aluminum, glass, wood, concrete, and the compositions can be used as adhesives for such materials, for encapsulating electrical apparatus and parts thereof, and for making castings, laminates, molded articles, and coatings.

For making laminates, a fibrous material such as glass filaments, mats or cloth is impregnated with the composition, which when solid is preferably dissolved in a solvent; the solvent is evaporated, and the impregnated glass fiber material may be stored for some time; the eventual laminate is made by bringing the impregnated fibrous material in the desired shape and curing at elevated temperature. Glass fiber rovings impregnated with the compositions, for example, may be wound onto a mandrel, and the formed unit may be heated to allow the polyepoxide adduct mixture to cure. Fiber mats or cloth impregnated with the compositions may be superimposed, and the assembly cured under heat and pressure, for example at temperatures of 100 to 300° C. and pressures of 1.75 to 35 or more kg./cm.² In such a way very strong laminates having resistance against heat and the action of organic solvents and corrosive liquids can be made. When using glass fiber it is preferred to give the fibrous material a prior treatment with a well-known finishing or sizing agent such as chrome methacrylate or vinyltrichlorosilane.

Castings and encapsulatings of electric equipment can also be made from compositions according to the invention. In such operations, the polyepoxide, the imidazole adduct, and other additives, if desired are mixed when necessary after melting, and the liquid mixture is poured into the mold and cured at elevated temperature.

The invention is also useful for making molded articles. Solid polyepoxide, imidazole adduct, and other additives if desired, such as co-curing agents, fillers and release agents are thoroughly mixed, by dry-blending (for example in a ball mill) or by fusion blending, such as in a Z-blade mixer, on hot rollers or in an extruder. The homogeneous mass can be flaked, pelleted, or cooled and ground to a powder having a suitable mesh size, e.g. an average particle size of 10–40 mesh (ASTM). The molding compounds so obtained have an excellent shelf life; very satisfactory results have been obtained in molding operations with powders according to the invention which had been stored for 6 months at 23° C. The molding compounds can be used in the melt-on technique (for which pellets are preferred), in compression molding, and in transfer molding. The molding temperature may vary. It is preferably from 130 to 180° C., for example 150° C., at which temperature a very fast molding operation is possible. The shelf life of the molding compound is determined by measuring the flow with the "pancake test" or the "spiral flow test." In the "spiral flow test" the transfer pot of a transfer molding press with a standard EMMI Spiral Flow Mold is loaded with about 20 grams of compound; the mold is kept at 150° C., and the non-preheated compound is pressed into the mold at a transfer pressure of 70 kg./cm.² and a transfer ram speed of 2.5 to 10 cm./sec. After cure the mold is opened, and the length of spiral filled with compound is recorded. In the "pancake test" the flow in a compression molding apparatus is recorded as the diameter of the pancake obtained from 10 g. of compound, at a pressure of 15,000 kg./cm.² and a temperature of 150° C. For making the molding compounds a combination of methods described above can advantageously be used. For example, the polyepoxide can be fusion blended with mold release agent (montan wax, carnauba wax, etc.), in which mixture fillers and pigments can be incorporated, and the mixture can be cooled, ground, and thoroughly mixed in a ball mill with imidazole adduct. The components may also be dry-blended in a ball mill, and the resulting blend subjected to a fusion blending, e.g. on a two-roll mill, or in an extruder, to ensure a more thorough blending.

Powders prepared as described above for molding compounds may also be used for making laminates, by superimposing layers of glass mat or glass cloth or other suitable fibrous material and powder, and subjecting the composite to pressure and high temperature, so that the powder melts and the melt is pressued into the fibrous material where it is cured.

Powders containing solid polyepoxides and imidazole adducts as described above can also be used for powder coating, according to various techniques, for example by fluidized bed coating and powder spray coating techniques, such as flame spraying and electrostatic powder spray coating. For these applications, the components (solid polyepoxide, imidazole adduct, if desired co-curing agents, pigments, fillers, anti-sagging agents and flow control agents) can be mixed by dry-blending (e.g. in a ball mill), or by fusion blending (e.g. in a Z-blade mixer on hot rolls or in an extruder such as a "Buss KO Kneader"), or by combinations of techniques as described above for molding powders. The cooled solid mix can then be ground (for example in a pin disc mill) and sieved to obtain a powder of the desired particle size, for example passing 45 mesh ASTM for use in a fluidized bed equipment, between 200 mesh and 45 mesh ASTM for use in an electrostatic fluidized bed, or less than 200 mesh ASTM for electrostatic spraying. The temperature in fusion blending is preferably kept as low as possible, to avoid cross-linking reactions, for example 60 to 90° C. for a composition wherein a polyepoxide is used having a softening point between 60 and 100° C.; extruders offer the advantage of a very short fusion blending time so that they may be used for making large quantities of formulations which are difficult to acompound in a Z-blade mixer.

Compositions containing polyepoxides and imidazole adducts can also be used in solution for surface coating, e.g. as stoving lacquers.

The invention is illustrated by the following examples. Parts therein are parts by weight.

The epoxies used to make the imidazole adducts and the polyepoxides used in the examples were the following:

"Cardura" E ("Cardura" is a registered trade name): a glycidyl ester of a mixture of saturated, aliphatic, monocarboxylic acids which have 9 to 11 carbon atoms per molecule, and wherein the carboxyl groups are attached to tertiary or quaternary carbon atoms. The epoxy equivalent weight of the glycidyl ester was 257.

Polyethers A, B, D and E: glycidyl polyethers of 2,2-bis-(4-hydroxyphenyl)propane having the following properties:

| Polyether | A | B | D | E |
|---|---|---|---|---|
| Epoxy equivalent weight | 190 | 250 | 500 | 970 |
| Molecular weight (approximate Mn) | 370 | 470 | 900 | 1,400 |
| Viscosity (poise, 25° C.) | 130 | | | |
| Melting point (Durrans'), ° C. | | 27 | 70 | 98 |

The imidazole adducts were made as follows:

Adduct E 24

"Cardura" E (257 g.) and 2-ethyl-4-methyl imidazole (110 g.) were mixed and kept at 60° C. for 8 hours. The adduct was liquid at 25° C.

Adduct A 24

Polyether A (190 g.) and 2-ethyl-4-methyl imidazole (110 g.) were mixed; the mixture was kept at 50° C. for 16 hours, cooled, and ground to a powder. The product was a solid, melting point 98° C. (determined on a Kofler bank).

Adduct A 2

Polyether A (100 g.) and 2-methyl imidazole (41 g.) were mixed; the mixture was kept for 12 hours at ambient temperature, then for ½ hour at 70° C., cooled, and ground to a powder. The product was a solid, melting point 79° C. (determined on a Kofler bank).

Adduct A 2B

Polyether A (100 g.) and 2-methyl imidazole (50 g.) were mixed; the mixture was kept for 12 hours at ambient temperature, then for ½ hour at 70° C., cooled, and ground to a powder. The product was a solid, melting point of 63° C. (determined on a Kofler bank).

Adduct B 24

Polyether B (250 g.) and 2-ethyl-4-methyl imidazole (110 g.) were mixed; the mixture was kept at 70° C. for 1 hour, cooled, and ground to a powder.

EXAMPLE I

This example demonstrates the accelerating effect on the cure by addition of the imidazole adduct.

A casting was made by compounding Polyether A (100 parts), isophorone diamine (23 parts) and Adduct E 24 (1.5 parts), pouring the mixture (100 g.) into a form, and curing. The peak temperature, reached after 78 minutes was 172.5° C. The same composition, but without Adduct E 24 reached a peak temperature of 152° C. after 93 minutes.

Electrical and mechanical properties of both cured systems were similar.

EXAMPLE II

This example demonstrates the better control of the exotherm by using imidazole adducts instead of imidazoles having a secondary amino group in the imidazole ring.

A mixture of 100 grams of Polyether A and 20 grams of Adduct E 24 was poured in a mold, brought to 60° C., and allowed to cure. The temperature rose to 226° C. within 133 minutes, and the casting was free from cracks.

For comparison, a mixture of 100 grams of Polyether A and 6 grams of 2-ethyl-4-methyl imidazole (this is equivalent to 20 grams of Adduct E 24) was given the same treatment. Here the temperature rose to 261° C. within 94 minutes, and the casting was badly cracked.

EXAMPLE III

A molding powder was prepared by mixing on a two-roll mill at 70° C. the following composition:

| | Parts |
|---|---|
| Polyether D | 100 |
| Omya BLR 3 (a surface treated calcium carbonate powder) | 145 |
| Montan wax | 3 |
| $TiO_2$ | 15 |
| Adduct A 2 | 10 |

The mixture was cooled and ground to a powder (particle size approximately 0.5 mm. diameter).

After molding for 3 minutes at 150° C., the cured article had a Vicat softening point of 115° C.

The shelf life was determined by the "pancake test." Directly after its preparation, the composition gave a "pancake" diameter of 263 mm. After storage at 20° C. for 18 weeks the "pancake" diameter was 219 mm., and after storage at 20° C. for 24 weeks the "pancake" diameter was 212 mm.

EXAMPLE IV

Example III was repeated with the exception that the 10 parts of Adduct A 2 were replaced by 8.2 parts of Adduct A 24.

After molding for 3 minutes at 150° C. the cured article had a Vicat softening point of 99° C. Direct after preparation of the powder the "pancake" diameter was 315 mm.; after storage at 20° C. during 18 weeks the "pancake" diameter was 295 mm.

EXAMPLE V

Example III was repeated with the exception that the 10 parts of Adduct A 2 were replaced by 10 parts of Adduct B 24. On molding for 3 minutes at 150° C. the molded article had a Vicat softening point of 103° C.; the shelf life, as measured by the "pancake test," was at least 18 weeks at 20° C.

Remarkably, the molding powders containing imidazole adducts as curing agents exhibit a very regular slow decrease of "pancake" diameter with increase of storage time at 20° C. This is in contrast with molding powders based on "B-stage" resins from polyepoxides and cycloaliphatic or aromatic polyamines, which normally show a very steep decline of "pancake" diameter after the first 7–9 days storage, and a somewhat less steep decline of "pancake" diameter after that time. The decline of "pancake" diameter of such "B-stage" resin powders at ambient temperature, however, is so much greater than that of the powders containing the imidazole adducts of the invention, that said "B-stage" powders have to be stored at 0° C. when storage for a considerable period is envisaged. At ambient temperature (20–25° C.) said "B-stage" powders can only be stored for about 3–4 weeks without too much loss of flow.

The powder containing imidazole adducts according to the invention exhibit greatly improved storage stability over the earlier "B-stage" powders whereas mechanical and electrical properties of the cured products are on a part with those of the "B-stage" resins.

In Table I the mechanical and electrical properties of moldings of Example III are compared with those of a "B-stage" resin which was prepared as follows:

Polyether A (100 parts), di(3-methyl-4-amino cyclohexyl)-methane (33 parts), Omya BLR 3 (250 parts), and montan wax (3 parts) are thoroughly mixed in a Z-blade mixer at room temperature (the Polyether A and montan wax were pre-mixed at 120° C., and cooled to room temperature). The composition is spread onto trays to a thickness of about 1.25 cm. and allowed to "B-stage" overnight; it is then cooled to about —5° C. and ground. The compound, indicated in Table I as "AC 260" had a storage life of 4 weeks at 20° C. Both compounds were molded at 150° C. for 3 minutes.

TABLE I

| | Compound of Ex. 3 | Compound AC 260 |
|---|---|---|
| Heat distortion temperature (° C.) | 115 | 100. |
| Flexural strength (kg./cm²) | 650 | 550. |
| Tensile strength (kg./cm.²) | 375 | 275. |
| Water absorption (weight percent) on immersion 24 hours at 23° C | 0.03 | 0.03. |
| Dielectric constant (50 c./s. at 25° C) | 5.3 | 5.5. |
| Tracking resistance | KA 3 C | KA 3 C. |
| Shelf life at 23° C | 6 months | <8 weeks. |

The tracking resistance (determined according to VDE 0303) is the resistance of an insulating material against formation of a track on the surface for electrical currents by thermal degradation of the material under influence of a surface current. In the standard method used in the examples, two electrodes, 4 mm. apart, are placed onto the surface, and an alternating potential of 380 v. is applied. An aqueous solution of $NH_4Cl$ and a surface-active is dropped onto the surface between the electrodes at a rate of 1 drop per 30 seconds. The number of drops required to cause a short circuit is recorded: if this number is between 1 and 10 the tracking resistance is designated as KA 1; if this number is between 11 and 100 the resistance is designated as KA 2; if after 100 drops no short circuit occurs the resistance is KA 3; the test is then stopped, and the depth of the groove caused by degradation of the surface is measured: KA 3a means that the groove is deeper than 2 mm., Ka 3b means that the maximum depth of the groove is between 1 and 2 mm., and KA 3c means that the maximum depth of the groove is less than 1 mm. KA 3c is the highest degree of tracking resistance which can be determined by this method.

EXAMPLE VI

A powder coating composition was prepared by dry-blending in a ball mill the following components:

| | Parts |
|---|---|
| Polyether E | 75 |
| Polyether D | 25 |
| Titanium dioxide | 7 |
| Dicyandiamide | 5 |
| Adduct A 24 | 3 |

The powder was applied on degreased aluminum foil and cured for 10 minutes at 180 to 185° C. The coating was glossy, and fully cured: the coating did not crack on sharp bending.

EXAMPLE VII

The procedure of Example VI was repeated, but with the omission of Adduct A 24. The curing temperature was 199° C., and the time required for full cure was 30 minutes. This indicates the accelerating effect of the imidazole adducts of the present invention.

EXAMPLE VIII

In the comparative composition of Example VII (without the imidazole adduct) the cure schedule was 190° C. for at least 30 minutes. In the composition of Example VI, however, full cure could be realized at temperatures as low as 130° C. at curing times of 45 to 60 minutes.

EXAMPLE IX

Example VI was repeated with the exception that Adduct A 24 was replaced by Adduct A 2. Similar results were obtained.

EXAMPLE X

The following components were dry-blended in a ball mill and used to prepare powder coatings of Example II:

|  | Parts |
|---|---|
| Polyether E | 75 |
| Polyether D | 25 |
| THPA | 12 |
| Adduct A 24 | 3 |
| Titanium dioxide | 7 |

(THPA is tetrahydrophthalic anhydride).

The components were dry-blended in a ball mill.

EXAMPLE XI

The compositions of Examples VI, VII, IX and X were applied to degreased cold-rolled steel panels and cured as indicated in Table II. The properties of the cured films are also tabulated in Table II.

TABLE II

| Composition | Example VI | Example VII (comparative example) | Example IX | Example X |
|---|---|---|---|---|
| Cure schedule | 15 min./180° C. | 30 min./190° C. | 15 min./180° C. | 15 min./180° C. |
| Penetration (Erichsen) | >8 mm | >8 mm | >8 mm | >8 mm |
| Mandrel bend (mm.) | <1 | <1 | <1 | <1 |
| MEK resistance [1] | 6 min | 3 min | 6 min | 6 min |

[1] MEK is methyl ethyl ketone.

What is claimed is:

1. A process for converting a polyepoxide having more than one vicinal epoxy group per molecule into an insoluble, infusible product which comprises heating said polyepoxide at an elevated temperature with a curing amount of a combination comprising (1) a fusible, ketone-soluble adduct prepared by reacting (a) an epoxy compound containing at least one vicinal epoxy group with (b) an imidazole compound of the general formula:

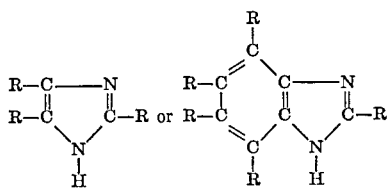

wherein each R is hydrogen or a hydrocarbon radical selected from the group consisting of alkyl and cycloalkyl radicals of up to 12 carbon atoms and aryl radicals, at a temperature from about 50° to 150° C. for about ½ to 24 hours, said epoxy compound and imidazole compound being employed in amounts to furnish from 0.8 to 1.2 epoxy groups per secondary amino group and (2) an epoxy co-curing agent.

2. A process as in claim 1 wherein the adduct is prepared from monoglycidyl esters of saturated monocarboxylic acids.

3. A process as in claim 1 wherein the adduct is prepared from monoglycidyl esters of alpha-branched, saturated, aliphatic monocarboxylic acids, having from 4 to 19 carbon atoms in the acid portion.

4. A process as in claim 1 wherein the adduct is prepared from a polyglycidyl ether of 2,2-bis(4-hydroxphenyl)propane.

5. A process as in claim 1 wherein the co-curing agent is at least one polycarboxylic acid anhydride.

6. A process as in claim 1 wherein the co-curing agent is dicyandiamide.

7. A shelf-stable, heat-curable composition comprising (A) a polyepoxide having more than one vicinal epoxy group per molecule and a curing amount of (B) a combination comprising (1) a fusible, ketone-soluble adduct prepared by reacting (a) an epoxy compound containing at least one vicinal epoxy group with (b) an imidazole compound of the general formula:

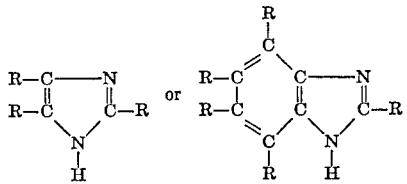

wherein each R is hydrogen or a hydrocarbon radical selected from the group consisting of alkyl and cycloalkyl radicals of up to 12 carbon atoms and aryl radicals, at a temperature from about 50° to 150° C. for about ½ to 24 hours, said epoxy compound and imidazole compound being employed in amounts to furnish from 0.8 to 1.2 epoxy groups per secondary amino group, and (2) an epoxy co-curing agent.

8. A composition as in claim 7 wherein the imidazole adduct is employed in amounts from about 0.1% to 20% by weight of the polyepoxide.

9. A composition as in claim 7 wherein the adduct is prepared by reacting a polyglycidyl ether of 2,2-bis(4-hydroxyphenyl)propane having an average molecular weight of from about 350 to 400 with 2-methylimidazole.

10. A composition as in claim 7 wherein the co-curing agent comprises at least one carboxylic acid anhydride.

11. A composition as in claim 7 wherein the co-curing agent is dicyandiamide.

References Cited

UNITED STATES PATENTS

| 3,438,937 | 4/1969 | Christie | 260—47 |
| 2,938,004 | 5/1960 | De Hoff et al. | 260—47 |
| 2,909,448 | 10/1959 | Schroeder | 117—141 |
| 3,294,864 | 12/1966 | Karoly et al. | 260—2 |

WILLIAM H. SHORT, Primary Examiner

T. E. PERTILLA, Assistant Examiner

U.S. Cl. X.R.

117—124 E, 127, 148, 169 R; 161—185; 260—2 EC, 2 N, 18 PF, 28, 37 Ep, 59, 47 EN, 78.4 Ep, 830 TW, 836

Notice of Adverse Decision in Interference

In Interference No. 99,141, involving Patent No. 3,756,984, C. H. J. Klaren, and H. Krak and F. Jeanno, EPOXY-IMIDAZOLE ADDUCTS AS CURING AGENTS FOR EPOXY RESINS, final judgment adverse to the patentees was rendered Feb. 1, 1977, as to claims 1 and 4–11.

[*Official Gazette July 5, 1977.*]